United States Patent Office 3,084,744
Patented Apr. 9, 1963

3,084,744
MISCIBLE FLOODING METHOD OF SECONDARY RECOVERY
John N. Dew, Philip W. Reed, and William L. Martin, Ponca City, Okla., assignors to Continental Oil Company, Ponca City, Okla., a corporation of Delaware
No Drawing. Filed Sept. 18, 1959, Ser. No. 840,813
9 Claims. (Cl. 166—9)

The present invention broadly concerns a secondary recovery method for obtaining oil from subterranean reservoirs. The invention more particularly relates to a method wherein the secondary recovery driving force is liquefied normally gaseous low molecular weight hydrocarbons, carbon dioxide, ethers, or alcohols.

It is common knowledge that one of the major problems in the production of oil is increasing the recovery of oil after the primary flow and pumping method are exhausted. The use of secondary recovery methods for removing oil from subterranean oil reservoirs is well known in the petroleum industry. It is a function of such procedures to make possible the recovery of oil from reservoirs that have ceased primary production. Secondary recovery measures may also be started before ultimate recovery by primary means is reached. Some secondary recovery methods work more efficiently at conditions of saturation and pressure greater than those remaining after ultimate primary recovery. Also early application of an external driving force eliminates the long period of low production rates characteristic of a reservoir approaching ultimate recovery.

In general, all secondary recovery methods employ a driving medium such as a liquid or gas for displacing additional oil from a partially depleted reservoir. The displacing medium is usually injected into a reservoir by means of one or more wells and the oil is displaced toward and withdrawn from other wells.

The utilization of water as a driving medium in secondary oil recovery methods has been extensive with the recovery results being up to 50 percent of the oil remaining after primary depletion. Water, however, has a major shortcoming, because on a microscopic basis it does not displace all the oil from the pores through which it flows, thus leaving a residual or unproduceable oil. It also is less satisfactory when utilized in the recovery of crude oils which are of the more viscous nature, as it tends to form fingers and bypass substantial portions of the oil within the reservoir.

Another medium which has become well established in the art is gas which is normally applied in some type of gas repressurization method. The use of gas as a flooding medium has even more disadvantages when the fingering effect is considered. Gas is probably the least efficient of all media giving an increased recovery of only approximately 15 percent of the unrecovered oil due to the poor volumetric sweep efficiency inherent in such system. The recovery of the more viscous crude oil from reservoirs is proportionately lessened by the use of gas due to the inherent inability of gas to be an efficient means of moving more viscous material.

The newest method of secondary recovery which is known in the industry is miscible flooding of reservoirs utilizing the injection of liquefied petroleum gas. The recoveries which have been accomplished utilizing this method have attained upwards of 60 percent of the oil remaining within the reservoir after primary depletion. Liquefied petroleum gas injection methods, however, are limited in their efficiency due to inherent fingering effects which occur and their inability to be applied to those reservoirs which contain asphaltic crudes.

Therefore, it is an object of this invention to provide an improved method of secondary recovery of oil which will result in the recovery of 80 to 90 percent of the oil remaining within a reservoir after primary production efforts.

It is also an object of this invention to provide a method of secondary recovery utilizing liquefied petroleum gas which may be applied to reservoirs bearing all types of crude oil. It is a further object of this invention to provide a method of secondary recovery which will allow the establishment of a uniform drive front and thus increase the volumetric sweep of the recovery method.

Another object of this invention is to provide a method of secondary recovery which may be applied to asphaltic crude oil-bearing zones within reservoirs which have been only partially depleted. Other objects and advantages of this invention will become apparent during the course of the following description.

This invention broadly comprises injecting an aromatic solvent or hydrocarbon oil fraction containing a minimum amount of low molecular weight hydrocarbons, which does not precipitate asphalt from asphaltic crude oil, into an asphaltic crude deposit within a reservoir followed by the injection of a miscible flooding medium which precipitates asphalt from asphaltic crude oil and is the driving medium for the subsequent recovery of oil from the partially depleted reservoir at a production well.

It is well known in the art that liquefied petroleum gas, carbon dioxide, ethers and alcohols, upon contacting an asphaltic crude oil, so act upon the crude as to precipitate asphalt from said crude oil. This precipitate is in the form of a brittle, fluffy or spongy material which will plug a well bore and the formation surrounding said well bore if this precipitation should occur in or near the bore of an injection well. The injection of liquefied petroleum gas into an asphaltic crude oil bearing formation will cause the immediate precipitation of asphalt in the area surrounding the well bore and such precipitation usually occurs to the greatest extent within approximately 15 to 20 feet of the well bore.

The pressure drop from the injection pressure to the average formation pressure of injected fluids in a radial flow system about a well bore under normal conditions is such that over fifty (50) percent of said drop occurs within a radius of sixteen feet of the well bore. Since the pressure differential between injection and formation pressures causes the flow of the injected fluid, the precipitation of asphalt in this region of high pressure gradient will seriously impede the flow of injected fluid. Liquefied petroleum gases precipitate asphalt from a highly asphaltic crude oil to such an extent that the formation permeability is normally reduced to about 15 percent of the original permeability. This reduction of permeability to subsequent injection of said flooding media renders it impossible to obtain injection rates sufficient to establish said fluids as an effective and efficient driving force.

This invention discloses a method of utilizing liquefied petroleum gas, carbon dioxide, ethers and alcohols in a miscible flooding process for the recovery of oil from a reservoir containing asphaltic crude oil by preventing asphalt precipitation in or near the well bore. The term liquefied petroleum gas as used throughout this application shall be understood to include liquefied normally gaseous low molecular weight hydrocarbons, and, for purposes of convenience in describing the invention, the terms carbon dioxide, ethers and alcohols may be considered to be interchangeable with the aforementioned term hereinafter. In addition to preventing the asphalt precipitation from plugging the well bore adjacently surrounding formation, this method allows said precipitation to be accomplished at a controlled distance from the well bore. The placement of the asphalt precipitation at a controlled distance within the formation enables the resultant deposit to be a competent means for obtaining a uniform liquefied petroleum gas drive front. This uniform drive front eliminates the fingering type of frontal advance previously associated with all liquefied petroleum gas drive recovery methods and sweeps a greater volume of the formation.

This secondary recovery method of miscible flooding utilizing liquefied petroleum gas can be effectively applied to any oil reservoir which contains asphaltic crude oil. This requisite of having an asphaltic crude deposit can occur naturally, or it can be accomplished by injecting a volume of asphaltic crude oil into a reservoir which is otherwise lacking or void of such oil. The determination that sufficient asphaltic crude exists within the formation by sampling, etc., makes it possible to subject said formation to this method of secondary recovery.

Asphalt is composed of two principal ingredients, asphaltenes and maltenes. The asphaltenes are high melting point organic solids usually occurring in petroleum in the form of a colloidal dispersion, and the maltenes are liquids of aromatic or partially aromatic character, which are soluble in any liquid hydrocarbon. In crude petroleum, some of the maltenes are adsorbed on the surface of the asphaltene particles and may be present to some extent within the asphaltene particles themselves. The remaining maltenes are in solution in the liquid parts of the crude oil, but the adsorbed maltenes and those in the liquid phase are in equilibrium. The asphaltene particles tend to flocculate when the quantity of adsorbed maltenes is decreased. Such a decrease can be caused by altering the composition of the liquid phase so that a greater proportion of the maltenes go into the liquid, thus upsetting the previous equilibrium of the maltenes. This may be done conveniently by adding a low boiling point, low molecular weight hydrocarbon to the system which reduces the maltene concentration in the liquid by the dilution effect. More importantly, the coefficient of distribution of the maltenes in the liquid is increased due to a higher solubility in the added low boiling point hydrocarbons than in the higher boiling point hydrocarbons normally composing a major portion of crude oil. Therefore two mechanisms act to decrease the maltenes adsorbed on the asphaltenes requiring maltenes to leave the asphaltenes and go into the liquid phase in order to re-establish equilibrium allowing the asphaltenes to coagulate or precipitate. This discussion of asphalt properties is from, "Asphaltic Bitumen as a Colloidal System," by Pfeiffer and Saal, published in the Journal of Physical Chemistry, vol. 44 (1940), page 139.

The above discussion applies to this invention in several ways. The miscible fluid used to displace the crude oil must be of sufficiently low molecular weight to cause precipitation; so the liquefied petroleum gases commonly used are excellent from this standpoint. Other materials miscible with crude oil, such as liquid carbon dioxide, alcohols, or ethers, act similarly in causing asphalt precipitation and thus may also be used. The asphaltic crude oil can be displaced outwardly from the injection well through the porous media by hydrocarbons which have a boiling point greater than about 100° C. at standard conditions of temperature and pressure without causing the precipitation of asphalt. Those which are economically preferable being kerosene, diesel fuel, pale oil, and any other readily available refinery cut. The mixing that occurs between the asphaltic crude and the displacing oil causes little change in the maltenes adsorbed on the asphaltenes, as the maltenes are not greatly soluble in the heavier oils.

Those reservoirs devoid or deficient of asphaltic crude can be subjected to the injection of such crude which may be either naturally occurring, or a synthetic mixture, may be substituted if it is more convenient. A suitable mixture can be prepared from refined asphalt and a high boiling point oil, such as kerosene, diesel fuel, pale oil, etc. However, depending on the nature of the asphalt and oil used, additional maltenes may be necessary to permit the dispersion of the desired quantity of asphalt. Asphalt can also be mixed with a crude oil if the concentration of low boiling point components is low enough to prevent the flocculation of the asphaltenes.

The first step of this invention is to determine that the oil-bearing reservoir traversed by the well bore contains a sufficient minimum amount of asphaltic crude oil which will furnish the necessary asphalt precipitate when contacted by liquefied petroleum gas. This asphalt may exist naturally, as in an asphaltic or certain mixed-base crude oil reservoirs, or such crude may be injected into the formation. The amount of asphaltic crude oil present in the formation should be sufficient to predominantly saturate a zone for a minimum distance of approximately ten (10) feet in diameter about the well bore which may be determined by the following equation:

$$V = \pi r^2 h \phi (1 - S_w) \quad \text{Eq. (1)}$$

$V$ = Asphaltic crude volume
$r$ = Average radius of asphaltic crude zone
$h$ = Thickness of permeable formation
$\phi$ = Average porosity of formation
$S_w$ = Interstitial water saturation, fraction After establishing the existence or nonexistence of a sufficient zone of asphaltic crude oil in the well bore and surrounding formation, the well bore can preferably be subjected to a well cleanout as known in the art. Thereafter an amount of asphaltic crude oil, as determined by the above Equation 1, should be injected through the well bore into the formation if such deposit is nonexistent.

This step is followed by the injection of an aromatic-type of solvent such as benzene or toluene, or other solvent for asphaltic materials such as carbon disulfide. A high boiling point hydrocarbon which will not cause precipitation of asphalt such as kerosene, diesel fuel, pale oil, etc., or a crude oil with a small concentration of low boiling components could be used. This solvent is injected into the well bore until a sufficient amount is injected to establish a zone of solvents surrounding the well bore to a desired radial distance, for example, a zone of approximately ten feet in diameter. The volume of solvent to be injected into the well bore to obtain a zone of solvent around the well bore should be equal to or greater than the volume calculated by Equation 1. Due to mixing of the solvent with the crude, it will be desirable to inject a quantity of solvent greater than the quantity of crude to be displaced, preferably in the order of the factor 1.5. The solvent acts to displace and drive the asphaltic crude from around the well bore and into the formation itself whereupon the crude is displaced and no longer exists in said zone.

Upon the completion of the injection of a sufficient amount of said solvent, the injection of a suitable liquefied petroleum gas, such as butane, propane, or the common light hydrocarbon product, "natural gasoline," is commenced. The liquefied petroleum gas should be injected at sufficient pressures in accordance with the temperatures present within the formation to cause it to remain in the liquid state. The following table of data on temperatures and pressures indicates the necessary conditions which must be maintained:

| Formation Temperature, °F. | Necessary Pressure, p.s.i.a. | |
|---|---|---|
| | Butane | Propane |
| 80 | 37 | 142 |
| 100 | 52 | 189 |
| 130 | 81 | 274 |
| 160 | 121 | 384 |
| 190 | 173 | 525 |
| 220 | 241 | |

The liquefied petroleum gas injected becomes the driving force within the reservoir, and as the volume injected increases it serves to displace the previously injected solvent farther into the formation itself whereupon, through mixing with the displaced crude and with the displacing liquefied petroleum gas, the solvent is no longer effective as a zone separating the crude and liquefied petroleum gas.

The liquefied petroleum gas then contacts the asphaltic crude of the formation and at the juncture of this contact of liquefied petroleum gas and asphaltic crude, asphalt is precipitated from the crude. This establishes a fixed zone of reduced permeability at some distance within the formation itself. This zone will be positioned at a distance of approximately 15 feet from the well bore when utilizing a zone of solvent ten feet in diameter about the well bore. By utilizing the method described, the precipitation of asphalt from the crude is removed as a possible deterrent factor to the continued injection of liquefied petroleum gas at the well bore; however the precipitation of asphalt is affirmatively controlled and caused to occur at the desired distance within the formation. This precipitation in the formation is used to control the movement of the injected liquefied petroleum gas and is accordingly converted into a built-in system of selectivity of permeability within the reservoir itself.

The volume of liquefied petroleum gas which must necessarily be injected to create an effective miscible flood drive is dependent upon numerous factors, such as porosity, permeability variation, viscosity differential, gas saturation, shape and size of formation, etc., coupled with well spacing and other field considerations which have many variances within separate formations. It is possible to determine the volume of liquefied petroleum gas which must be utilized by substituting the following factors for each flooding system in the following equation:

$$V = 7,584 A h \phi (1 - S_w) E_A E_{PV} E_V \qquad \text{Eq. (2)}$$

$V$ = Volume of injected fluid at reservoir conditions in barrels
$A$ = Area to be flooded in acres
$h$ = Average thickness of porous formation in feet
$\phi$ = Fractional average porosity of formation to be flooded
$S_w$ = Fractional average interstitial water saturation
$E_A$ = Fractional area swept by injection fluid at breakthrough of injected fluid at a producing well
$E_{PV}$ = Fractional volume swept (less than one due to the permeability variation within the formation)
$E_V$ = Fractional volume swept (less than one due to the variation of viscosity ratios between crude and displacing medium)

The liquefied petroleum gas, as a driving front displacing crude, tends to flow into those zones within the formation which are most permeable due to the lack of saturation of said zone with crude, or other formation factors. The liquefied petroleum gas upon injection into the zones of higher permeability precipitates asphalt from the crude into said zone. This reduces the permeability and locally increases the resistance to flow, whereupon the driving front is directed to zones of lower original formation permeability.

Asphalt will also be deposited in the lower permeability zones at the juncture of contact of the liquefied petroleum gas and asphaltic crude oil, but due to the more distant penetration of liquefied petroleum gas into the high permeability zones, asphalt will be deposited over a greater distance in the more permeable zones. Thus the resistance to flow will be increased proportionally more in the high permeability zones than in the low permeability zones. Liquefied petroleum gas will therefore advance into lower permeability zones which would normally be bypassed by the advancing fingers of liquefied petroleum gas. This causes a greater portion of the reservoir to be swept by the liquefied petroleum gas and therefore a greater percentage of the oil in place can be recovered.

The selectivity of the liquefied petroleum gas as a driving front results in a precipitation of said asphalt causing zones of reduced permeability within the formation. These zones act as an effective device to maintain uniform passage of the liquefied petroleum gas therein, and the resultant driving front becomes accordingly more uniform.

A zone of the precipitated asphalt which is complete in the degree of its precipitation by liquefied petroleum gas has a markedly reduced permeability. This can occur to the extent that, with a highly asphaltic crude, it is normally reduced to 15 percent of its previous permeability. A typical laboratory experiment would best indicate the reduced permeability of a formation subsequent to precipitation of asphalt therein. A core of Berea sandstone 2½ inches in diameter and 6 inches in length was mounted in a steel pipe in a manner which allowed fluids to be flowed through it under pressure. The core was saturated with water and then highly-asphaltic, crude oil from the First Grubb formation of the San Miguelito Field, California, was flowed through the core until no more water was produced. The permeability of the core to the crude oil was measured, and the oil was then displaced by injecting liquid propane under pressure until no more oil was produced. The permeability of the core to propane was found to be approximately 15 percent of that measured for the crude oil.

This reduction of permeability slows but does not prevent the passage of liquefied petroleum gas through said precipitated asphaltic zone. The continued injection of liquefied petroleum gas results in a recovery of the crude oil present within the formation without the deleterious effect of fingering which previously existed in miscible fluid systems because of the more uniform front which is resultant from the asphalt restriction created within the formation.

It is also possible to obtain and utilize the uniform miscible drive front which is described in this application in the more numerous reservoirs which contain other than asphaltic crudes. The desired asphalt precipitation may be obtained by injecting asphaltic crudes into the injection well prior to the injection of the solvent until such amounts are injected as will fill the zone surrounding the well bore to the desired distance, for example, approximately ten to twenty feet. Thereafter the solvent is injected as above, followed by the liquefied petroleum gas whereupon the asphalt is precipitated into a resultant uniform zone of reduced permeability which regulates the movement of the liquefied petroleum gas front within such a reservoir as a paraffinic, naphthenic or other mixed types.

The economics of the miscible flooding type secondary recovery method may require that the amounts of liquefied petroleum gas be limited to those less than would be necessary to effectively produce the crude from within the formation. It is, however, possible to supplement the injection of liquefied petroleum gas with the injection of another flooding media, such as water or gas. This injection is subsequent to a sufficient initial injection of liquefied petroleum gas which can be made to maintain a zone of liquefied petroleum gas between the crude and the supplementary injection material, or merely to establish the zone of precipitated asphalt in the formation surrounding the injection well. The volume of water or gas to be injected as supplementary flooding media can be determined by methods well known in the art.

The injection of liquefied petroleum gas can be maintained in a continuous manner or it can be conducted in a slugwise manner in conjunction with water or gas to obtain more economical operation. The crude oil is thereby driven through the formation by the liquefied petroleum gas front to be recovered at the production well and obtained at the surface.

The injection of liquefied petroleum gas can be advantageously limited to such volume as will prevent the production of a mixture of liquefied petroleum gas and asphaltic crude. Serious operating difficulties occur when liquefied petroleum gas and asphaltic crude oil are commingled in the well bore, tubing, and surface equipment of the production well. Due to the irregular nature of liquefied petroleum gas advance and the non-uniform permeabilities found in petroleum reservoirs, liquefied petroleum gas may be produced from some strata, while asphaltic crude is produced from other strata. Commingling asphaltic crude and liquefied petroleum gas at the production well precipitates asphalt deposits therein causing possible difficulties, such as plugging, etc., in said facilities. The production of a mixture of liquefied petroleum gas and crude as a breakthrough at the producing well can be prevented by limiting the volume of said injected gas, which can be determined with Equation 2 by inserting the proper distance factor. The prevention of such breakthrough production in the method of slugwise injection, wherein a zone of liquefied petroleum gas is followed by the injection of supplemental media such as water or gas can be accomplished by limiting the size of the miscible zone so that it is incapable of precipitating asphalt as it approaches the producing well due to dilution and mixing. This volume will generally be less than 20 percent of the hydrocarbon pore volume of the volume of the pattern to be swept.

Subsequent to the recovery of the optimum amounts of crude oil from the formation, the liquefied petroleum gas remaining therein can be recovered by a gas or water sweep of the formation if such amounts of liquefied petroleum gas make the operation economically feasible. This allows the complete recovery of the optimum amounts of oil from the reservoir coupled with the recovery of any miscible flooding media which have independent economic values within themselves.

The method of miscible flooding described increases the volumetric sweep obtained in the reservoir and thus proportionally increases the amount of oil recovered. Two basic mechanisms promote the higher sweep efficiency. The asphalt precipitated in the areas swept by liquefied petroleum gas, beyond a certain desired distance from the well bore, reduces the mobility of the displacing fluid. As the mobility of the displacing fluid is reduced relative to the mobility of the displaced fluid, the areal coverage of a flood is increased. A reduction of displacing fluid mobility by a factor of 7 as is possible when displacing a highly asphaltic crude gives a 15 to 20 percent improvement in areal sweep. In addition asphalt will be deposited over a longer distance in the more permeable regions due to the greater rate of advance of liquefied petroleum gas in more permeable regions. This gives a greater proportional flow restriction in high permeability regions than in low permeability regions and causes the liquefied petroleum gas to flow into regions normally bypassed.

In order to disclose the nature of the present invention more clearly, the following illustrative examples are given. It is understood that the invention is not to be limited to the specific conditions or details set forth in these examples except insofar as these limitations are specified in the appended claims.

Example 1

The proposed method of oil recovery was applied in a shallow field in Wyoming which was drilled on a uniform 5-acre spacing pattern to a producing depth averaging 1,068 feet. The producing formation was a sandstone having an average porosity of 26 percent, with wide variations in permeability, including sections up to 2,000 md. Water saturation was 35 percent, and thickness of the net pay was 18 feet in the test area. The 28° API crude had a viscosity of about 10 cp. and contained little solution gas. A 5-spot pattern using existing wells, consisting of 4 injection wells at the corners of a 10-acre square with a producing well at the center, was chosen in which about 4 percent of the oil in place had been produced by primary depletion, leaving about 198,000 barrels of stock tank oil as the oil content of the test area.

The wells were reworked as necessary to put them in good mechanical condition. The crude was determined to be sufficiently asphaltic by observation of deposits formed when the crude and butane were mixed in a windowed pressure cell. The solvent consisted of a mixture of impure, mainly aromatic solvent and weathered paraffinic crude oil, and four hundred barrels of solvent were injected into each injection well. Seventeen thousand barrels of liquefied petroleum gas were then injected into each input well after which water was injected at a rate of about 200 barrels per day. The producing well quickly responded to the injection, and breakthrough of liquefied petroleum gas occurred in 22 months when 78,000 barrels of stock tank oil had been produced, or approximately 45 percent of the oil content. This was an exceptionally high recovery, considering that 35 percent recovery would be expected from a 5-spot of uniform permeability with a similar viscosity crude and that some crude was lost as asphalt deposits. In an additional 8 months, 43,000 barrels of oil were produced, increasing the recovery to 61 percent of the oil content; and although at that time considerable water was being produced, oil production was still about 90 barrels per day.

Example 2

A pilot field trial of miscible displacement was conducted in a Wyoming field covering about 300 acres having a net pay thickness of 6 feet at a depth of 6,900 feet. The formation was a clean sandstone with an average porosity of 14 percent, and the net pay section included permeabilities from 8 to 400 md. The produced crude was paraffinic having a 41° API gravity and a viscosity of .55 cp. at the formation temperature of 180° F. and pressure of 623 p.s.i. The primary production had created a gas saturation of 19.1 percent, and average water saturation from core analysis was 23.6 percent. A test area at one end of the reservoir was chosen which included an injection well and two producing wells as a direct and a diagonal offset from the injection well. The test area was defined as the area bounded by squares with the injection well at a corner and a producing well at the opposite corner. The oil content of the test area was estimated as 191,000 barrels of stock tank oil.

The injection well was completed open hole with the casing set near the top of the sand section, but it had been shut in due to low production. The well was checked for cavings and equipped with tubing set with a packer at the bottom of the bottom of the casing. Five hundred eighty barrels of asphaltic crude were injected to establish an asphaltic zone about 40 feet in radius around the well, followed by the injection of 175 barrels of an impure, mainly aromatic solvent which was sufficient to move the crude about 15 feet from the well bore. Surplus butane and propane product from the local gasoline plant was then injected at an average rate of 7,000 barrels per month as the injection well would take 350 barrels per day at a surface pressure of essentially the vapor pressure of the product injected.

Production was regulated to equal the volume injected; so there was essentially no pressure change in the reservoir. Initial production was at a gas-oil ratio of 2,500 standard cubic feet per barrel, but the ratio decreased rapidly and was about 500 s.c.f./bbl. at the time of liquefied petroleum gas breakthrough at the direct offset producing well. Oil recovery at breakthrough was about 86,000 barrels of stock tank oil which was 45 percent of the oil content of the test area. Twenty-five to thirty percent of the oil content would normally be expected from a miscible displacement in a relatively uniform formation. A total of 158,000 barrels of liquefied petroleum gas had been injected at the time of breakthrough and production continued after breakthrough with very little decrease in rate with the ultimate recovery not yet completed.

It will be understood that the examples included herein are illustrative only and that the invention is to be taken as limited only by the scope of the appended claims.

We claim:
1. A method of recovering hydrocarbons from a subterranean formation containing a predominantly asphaltic crude oil and being traversed by a plurality of wells comprising the following steps:
   (a) injecting a first liquid through at least one of said wells into said formation to displace said crude from the formation about said well, said first liquid being nonaqueous and nonasphalt precipitating;
   (b) terminating the injection of said first liquid upon forming a deposit of said first liquid about said well;
   (c) injecting a second liquid through said well into said formation displacing said first liquid and crude oil outwardly from said well in such a manner that said first liquid is mixed with the crude oil and said second liquid thereby eliminating said first liquid as a distinct deposit in the formation at a location intermediate of the remaining wells, said second liquid being nonaqueous and asphalt precipitating;
   (d) injecting further amounts of said second liquid whereby asphalt is precipitated within said formation altering the permeability and increasing uniformity of displacement of said hydrocarbons in the formation;
   (e) displacing said hydrocarbons from the formation by the continued injection of said second liquid; and
   (f) recovering said hydrocarbons from said formation through the remaining wells to the surface.

2. The method in accordance with claim 1 in which said first liquid is an aromatic-type solvent.

3. The method in accordance with claim 1 in which said first liquid is a hydrocarbon having a boiling point in excess of 100° C. at standard conditions of temperature and pressure.

4. The method in accordance with claim 1 in which said second liquid is a liquefied normally gaseous low molecular weight hydrocarbon.

5. The method in accordance with claim 1 in which said second liquid is a mixture of liquefied normally gaseous low molecular weight hydrocarbons.

6. The method in accordance with claim 1 in which said second liquid is injected in incremental amounts in an alternate slugwise manner with conventional flooding media.

7. The method in accordance with claim 1 in which an initial injection of said second liquid is followed by a continuous injection of conventional flooding media.

8. The method in accordance with claim 1 in which the injection of said second liquid is terminated upon the precipitation of substantial asphalt at a location in the formation intermediate of the remaining wells and a conventional flooding media is thereafter injected displacing the hydrocarbons from the formation.

9. The method in accordance with claim 1 in which a conventional flooding media is injected into the formation after optimum hydrocarbon recovery with said second liquid whereby said second liquid is recovered from the formation.

References Cited in the file of this patent
UNITED STATES PATENTS

| | | |
|---|---|---|
| 2,272,672 | Kennedy | Feb. 10, 1942 |
| 2,708,481 | Allen | May 17, 1955 |
| 2,713,906 | Allen | July 26, 1955 |
| 2,867,277 | Weinaug et al. | Jan. 6, 1959 |
| 2,876,840 | Berry | Mar. 10, 1959 |

OTHER REFERENCES

The Petroleum Engineer, article by Clark et al., "Latest Oil Recovery Idea," pages B-21 to B-26, September 1957.